Oct. 22, 1968

R. E. JEHLE 3,407,299

WIDE RANGE RADIATION DETECTOR

Filed Feb. 10, 1965

INVENTOR.
ROBERT E. JEHLE

BY

ATTORNEYS

Oct. 22, 1968   R. E. JEHLE   3,407,299
WIDE RANGE RADIATION DETECTOR
Filed Feb. 10, 1965   5 Sheets-Sheet 3

INVENTOR.
ROBERT E. JEHLE
BY Ernest J Weinberger
John W. Pease
ATTORNEY

INVENTOR.
ROBERT E. JEHLE

United States Patent Office 3,407,299
Patented Oct. 22, 1968

3,407,299
WIDE RANGE RADIATION DETECTOR
Robert E. Jehle, Woodhaven, N.Y., assignor to the United States of America as represented by the Secretary of the Navy
Filed Feb. 10, 1965, Ser. No. 431,743
10 Claims. (Cl. 250—83.6)

ABSTRACT OF THE DISCLOSURE

An apparatus and method for measuring a wide range of ionizing radiation which includes generating a repetitive series of pulses of different durations and each of a voltage amplitude sufficient to energize a GM tube. The resultant current pulses emanating from the GM tube are counted in synchronization with the said pulse series.

---

The invention described herein may be manufactured and used by or for the Government of the United States of America for governmental purposes without the payment of any royalties thereon or therefor.

The present invention relates to the measurement of ionizing radiation intensities and more particularly to the measurement of a wide range of intensities with the use of a Geiger-Muller tube. The highest of these ranges being such as to present a physical hazard to personnel within the area.

In an environment where the ionizing radiation intensity is unknown and may extend into the range of impairing personal safety, it is not advisable unless absolutely necessary, to allow direct measurement within the field by the operator. Since in the majority of instruments operable to measure extended intensity ranges it is necessary to change the scales due to the inherent limitations of detectors such as GM tubes, remote or telemetric operation is employed. This form of measurement would also apply to the probing, measurement and plotting of outer space radiation intensity as the Van Allen belt. In both cases one could simply employ several instruments all set to different ranges and simply read the highest. This solution, although used, presents certain drawbacks primarily, the need for excessive space and weight in addition to accessory equipment and added expense. Essentially, one could set the operating range to the highest available. This, however, decreases the sensitivity of the instrument and thereby limits the accuracy of the measurements.

It is therefore an object of this invention to provide a method and a circuit arrangement in conjunction with a GM tube to measure ionizing radiation intensity over an extended range.

Another object is to provide a simple, lightweight, safe and inexpensive instrument for the measurement of an unknown ionizing radiation intensity without physically endangering personnel in its operation.

Other objects and advantages will appear from the following description of an example of the invention, and the novel features will be particularly pointed out in the appended claims.

Figure 1:
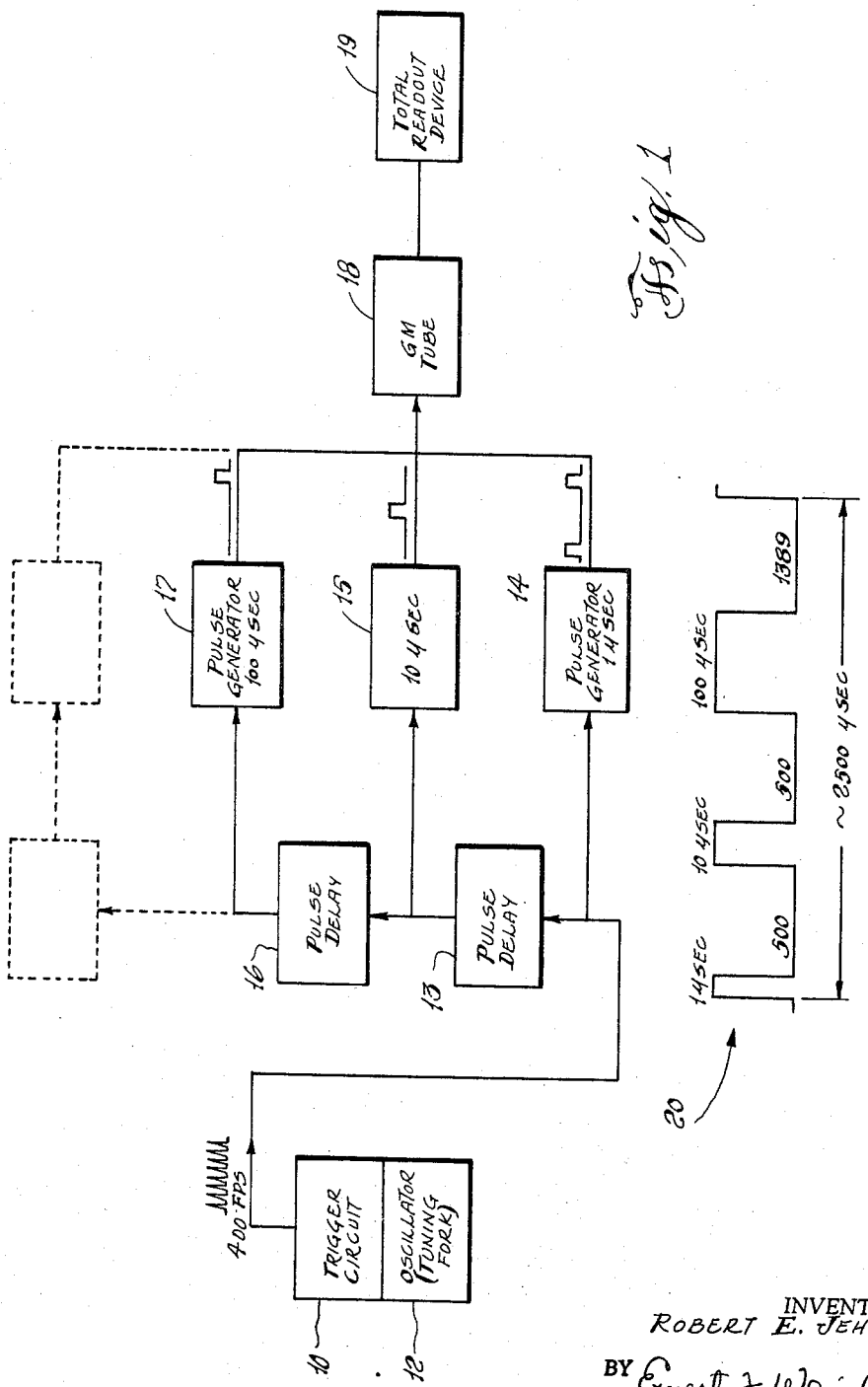
FIG. 1 is a block diagram of a simple embodiment made in accordance with the principles of this invention.

In the illustrated embodiment of the invention as shown in FIG. 1, a source 10 of a series of repetitive pulses 11 may comprise a combination of an oscillator 12 controlled by a tuning fork and a trigger pulse output circuit 13 which converts the oscillations into pulses. By way of example consider a 400 cycle oscillator with a final output of pulses at a pulse repetition rate of 400 pulses per second. The output of this source 10 is jointly fed into a pulse delay circuit 13, and a 1 microsecond pulse generator 14 which is activated by a trigger pulse input from the source. The output of the pulse delay circuit 13 is simultaneously fed into the 10 microsecond pulse generator 15 and into pulse delay circuit 16 whose output in turn is applied the 100 microsecond pulse generator 17. The outputs of the pulse generators are all applied to one of the electrodes of Geiger-Muller tube 18 depending on the polarity of the pulses emanating from the generators. A standard readout device 19 indicates the current pulses generated within the tube by way of indicating the pulse rate per time when it is activated by ionizing radiation entering therein. This device 19 can be of any known circuitry presently employed in conjunction with GM tubes as in radiacs. In order to set forth a typical example in the explanation, specific frequencies, pulse repetition rates and widths have been indicated. These values are merely to illustrate one operable embodiment found satisfactory and should not be construed as being limited thereto.

The oscillator of the source 10 generates a 400 cycle signal which produces a 400 pulse per second output therefrom. The first delay circuit 13 is set to provide an approximate 500 microsecond delay. While in this example, the second delay also provides the same delay this need not necessarily be the case. The pulse generators are set to generate pulse widths varying from one another by decades, namely, 1, 10 and 100 microseconds. The final combined output is illustrated graphically at 20 for one cycle of the oscillator. The pulse emanating from the source 10 initially triggers generator 14, then at some later time triggers generators 15 and 17 so as to provide for each period a series of three pulses of varying time durations. The readout device 19, in effect, integrates the current pulses generated in the GM tube 18 during all the pulses and provides an overall output indication.

Figure 2:
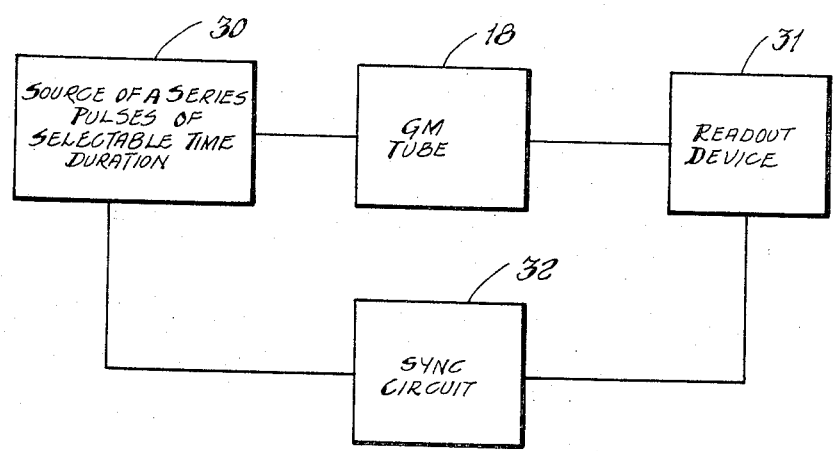
FIGS. 2 and 3 represent in block form another embodiment made in accordance with the invention.
Figure 3:
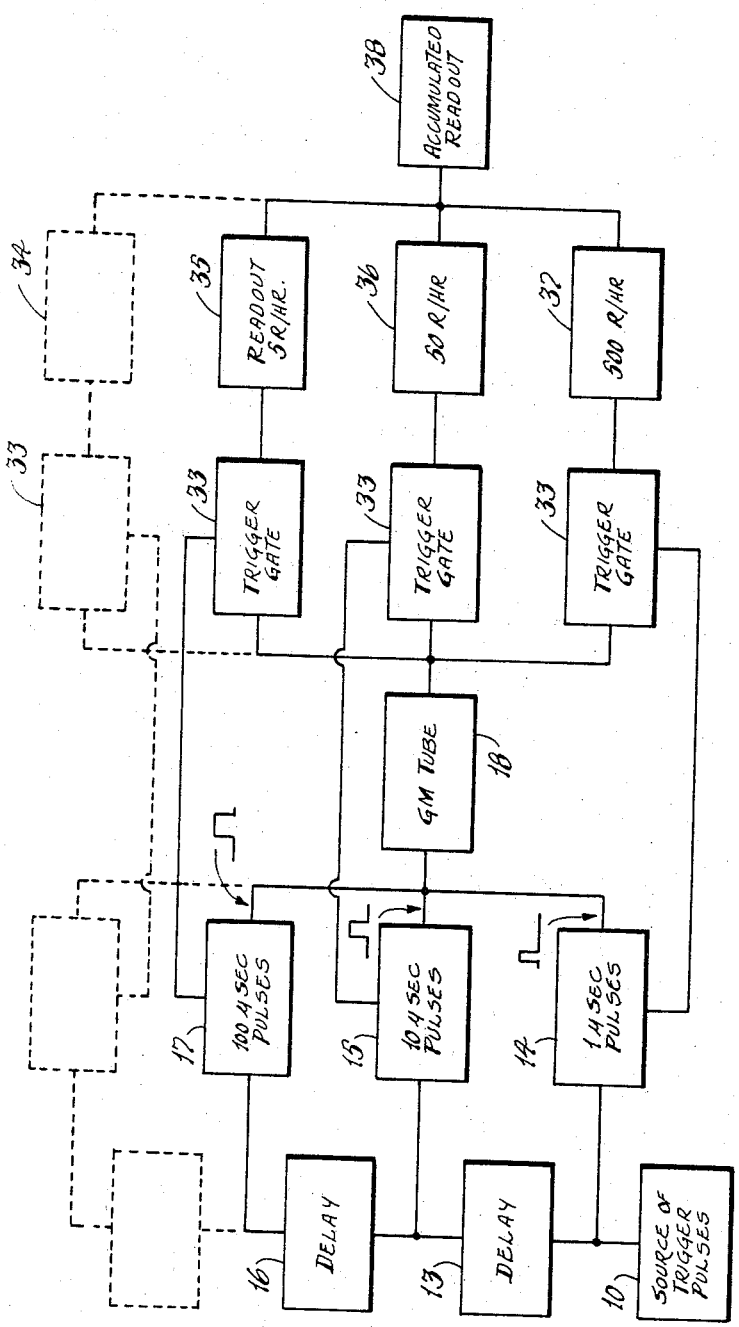

FIG. 2 illustrates in basic form a modification of the embodiment of FIG. 1 so as to permit sampling of the output for the period of one or more of the input pulses. A source of selectable time duration pulses similar to those shown at 20 of FIG. 1 are applied to the GM tube 18 and the tube generates current pulses during each of the input pulses which are fed into the readout device 31. Connected between the source 30 and the readout device 31 is a synchronizing circuit 32 which controls the activation of the readout 31. The synchronizing circuit 32 is designed to allow the readout 31 to indicate or operate only during selected periods which coincide with one of the pulses generated by the source 30. Thus as shown in FIG. 3, a series of trigger gates 33 serve to provide the sync functions. The blocks designated by reference numerals identical to those of FIG. 1 indicate the same circuitry or function in FIG. 3. The pulse emanating from pulse generators 14, 15 and 17 are all applied to the GM tube 18 so as to maintain it active for three different periods for each cycle. The tube is first active for one micro-second (pulse from 14) then off for a sufficient time to be ready to the next succeeding pulse. On again for ten micro-seconds, then off and active once more during the cycle for 100 micro-seconds then off until the commencement of the next cycle with the one micro-second pulse. These pulses are concurrently applied to trigger gates which for the purpose of this embodiment merely act as normally open switches and closed only for the duration of an input pulse. In this manner each of the readout devices 35 to 37 are receiving an input only for the duration of the pulse which is triggering the gate connected between the readout device and the output of the GM tube 18. Each of the readout devices is set to read a different radiation level dependent upon the duration of the activating pulse with which its input is synchronized. Since the pulse repetition rate of the source 10, the delays and pulse durations may be varied and the readout levels or ranges are thereby selectable. As for example, with a 400 p.p.s. source, the one micro-second pulse allows an indication of 500 r./hr. while a pulse of 0.1 micro-second duration would permit measurement intensity of 5,000 r./hr. Where an aggregate or accumulated reading is desired a readout device 38 can be connected to receive the combined outputs of the individual readouts and integrate them.

Figure 4:
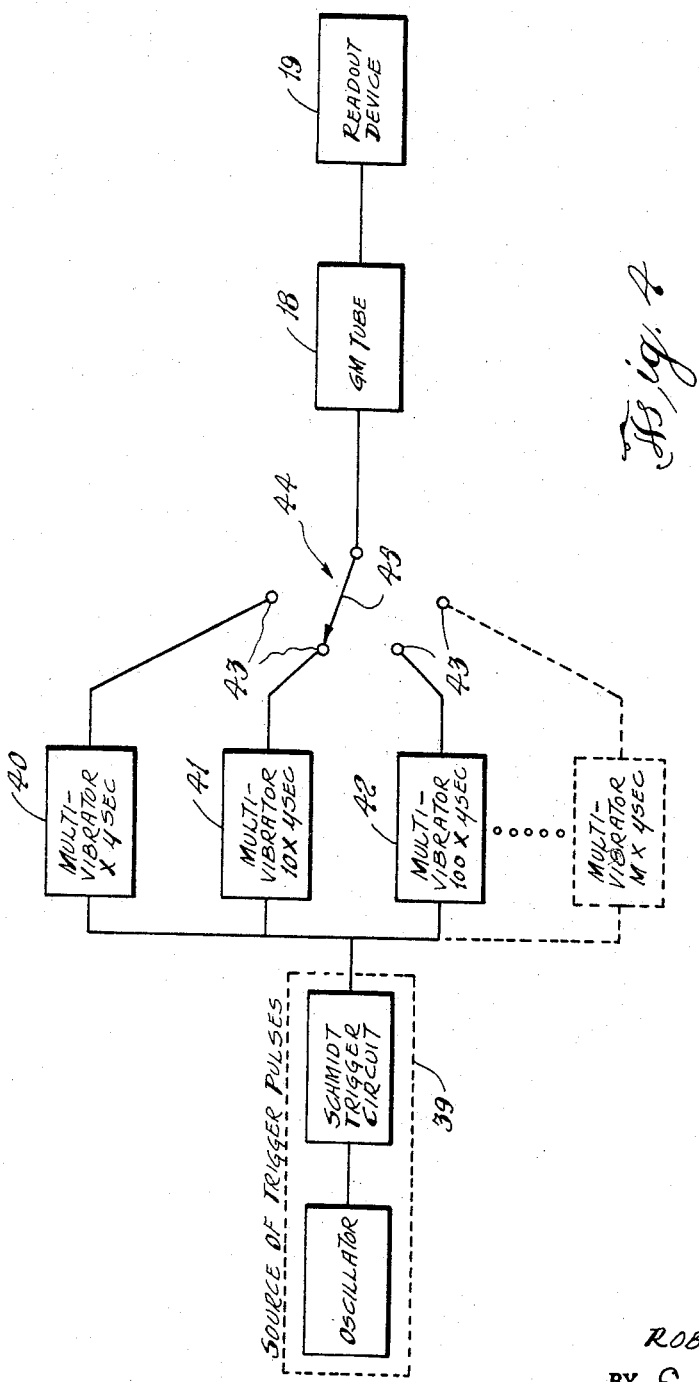
FIG. 4 represents an embodiment made in accordance with the invention which is capable of singular manual selection and operation.

A simplified embodiment of the invention suitable for direct manual operation is illustrated by way of FIG. 4 wherein a source of trigger pulses 39 applies its output simultaneously to a series of one-shot multivibrators 40–42 whose outputs are applied to the stationary contacts 43 of single pole four throw switch 44. The pole 45 is connected to the anode of GM tube 18 while a readout device 19 also connected thereto counts or indicates the current pulses generated therein by radiation entering the tube. Each multivibrator is selected to provide a pulse of the proper amplitude and of a different duration so that by manual selection the time during which the GM tube is able to respond per unit time can be varied. This in effect changes the range of measurements and permits an extensive degree of latitude in the measurements. Clearly one multivibrator could be substituted for those shown by merely providing it with a selectable time constant or pulse duration (width).

Figure 5:
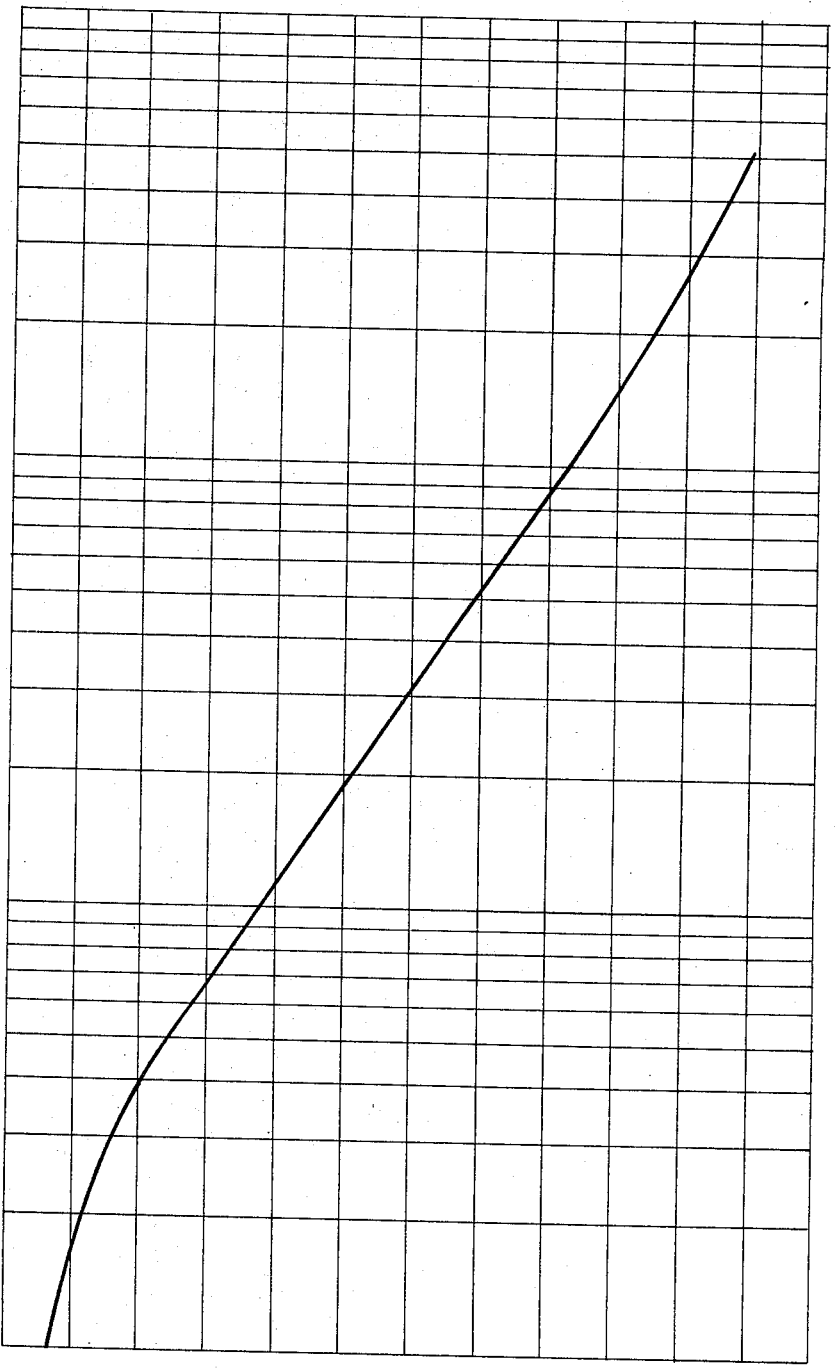
FIG. 5 is a graph showing the response characteristics of a typical GM tube used in accordance with this invention.

Since in all the embodiments illustrated it is necessary that the response of the GM tube in counts per unit time be related in a known manner to the intensity of the ionizing radiation inducing the counts various comparisons have been made. Typical of these is the curve shown in FIG. 5 where a plot was made of field intensity (r./hr.) against counts per second occurring in the GM tube.

Summarizing the overall operation of the wide range measurement of intensity it should be remembered that every time an enabling pulse is applied to the GM tube it does not imply that the tube will produce an output current pulse. Whether the tube responds, or how often, is determined by the intensity of the ionizing radiation, and the shape of the enabling pulse. By keeping the pulse shape constant for all pulse widths this parameter's effect is minimized. The tube response is on a probability basis. For a fixed radiation intensity it is approximately ten times more probable that an output current pulse will occur when a 100 micro-second pulse is applied to the GM tube than when a 10 micro-second pulse is applied and 100 times more probable than for a 1 micro-second pulse. The tube sensitivity is therefore a function of the pulse width or duration and so the sensitivity of the tube may be changed by altering the pulse width. By repetitively applying groups of pulses of different widths the tube assumes a number of different sensitivities during each group. As an example the GM tube is first pulsed with a 100 micro-second pulse then with a 10 micro-second pulse and finally with a 1 micro-second pulse. This group of pulses is repeated at a selectable repetition rate so that the tube is continuously and simultaneously operable at three different sensitivities or ranges. It should be noted that the number of ranges is adjustable by providing more pulses for each group and the actual ranges themselves by changing the pulse durations. This feature provides the tube with the capability of measurements over an extensive range while maintaining its sensitivity, i.e., no loss of sensitivity. Remote and telemetric operation is therefore possible since no physical switching is necessary at the tube. Additionally the order or sequence of the pulses in the group can be changed as well as the fact that the groups may consist of the same width pulses in the first group and a second group of another pulse width, etc. In other words the pulses in each group could be identical while the groups are different from one another.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A method for measuring ionizing radiation intensity over a wide range which comprises:
generating a repetitive series of time spaced pulses of different time durations and each of sufficient amplitude when applied to an electrode of a GM tube to permit said tube to detect entering radiation and generate a current pulse thereby, and
applying said pulses to an electrode of a GM tube,
counting said current pulse per unit time,
whereby said count will be an indication of the radiation intensity entering said GM tube.

2. A method for measuring ionizing radiation intensity over a wide range which comprises:
generating a cyclic repetitive series of time spaced pulses of different widths,
applying said series of pulses to an electrode of a GM tube,
repetitively sampling the current pulse output of said GM tube,
synchronizing said sampling with the application of one of said repetitive pulses of a specific width,
counting said sampled output,
whereby said count will be an indication of the radiation intensity of a particular range dependent on the width of the pulse samples.

3. A circuit arrangement for the measurement of ionizing radiation intensity which comprises:
means for cyclically and repetitively generating a plurality of time spaced pulses of different durations,
a Geiger-Muller tube having an anode and a cathode,
read out means connected to said GM tube for indicating the current pulses emanating in said tube per unit time.

4. The arrangement according to claim 3, further including synchronizing means interposed between said GM tube and said readout means and operative coupled with said means for generating for applying said current pulses to said readout means in synchronization with one of said plurality of spaced pulses.

5. The arrangement according to claim 4, wherein said readout device is a pulse counter.

6. A circuit arrangement for the measurement of ionizing radiation intensity over an extended range which comprises:
a source of repetitive trigger pulses,
selectable switch means having a plurality of input contacts and one output terminal,
a plurality of signal paths each including therein in series said source,
means for generating an activating pulse of selectable time duration upon the input of a trigger pulse,
one contact of said switch means,
a Geiger-Muller tube having on of its electrodes connected to said terminal,
a readout means for indicating the activity of said tube connected thereto whereby said readout device will indicate the ionizing intensity of radiation impinging on said tube and the intensity range selected by said switch means and the time duration of said generated activating pulses.

7. The circuit arrangement according to claim 6 wherein said switch means is a multicontact single pole switch.

8. The circuit arrangement according to claim 7 wherein said means for generating an activating pulse is a one shot multivibrator.

9. A circuit arrangement for the measurement of ionizing radiation intensity which comprises:
a source of trigger pulses,
a plurality of one shot multivibrators each capable of generating a pulse output of a selectable time duration for each trigger pulse input, said time durations of each multivibrator being different from the others,
the output of said source connected directly to the one of said multivibrators generating the shortest time duration output,
a plurality of pulse delay means of varying time delays, said delay means connected in tandem with the shortest delay first and the longest delay last,
the output of said source connected to the input of said shortest delay means,
the output of each of said delays connected to the input of one of said multivibrators,
the outputs of said multivibrators connected together whereby a series of time spaced pulses of varying time durations are produced thereat,
a Geiger-Muller tube having anode and a cathode electrode, one of said electrodes connected to the outputs of said multivibrators,
a pulse counter connected to said GM tube for indicating the current pulses emanating from said tube per unit time,
synchronizing means interposed between said GM tube and said counter and operatively coupled with said plurality of multivibrators for applying said current pulses to said readout means in synchronization with one of said plurality of spaced pulses.

10. The circuit arrangement according to claim 9 wherein said synchronizing means are a plurality of trigger gates individually connected to one of said multivibrators.

References Cited

UNITED STATES PATENTS

| | | | |
|---|---|---|---|
| 2,648,015 | 8/1953 | Greenfield et al. | 250—83.6 |
| 3,129,333 | 4/1964 | Di Ianni | 250—83.6 |
| 3,144,558 | 8/1964 | Schneider | 250—83.6 |
| 3,319,066 | 6/1967 | Gernert | 250—83.6 |

RALPH G. NILSON, *Primary Examiner.*

S. ELBAUM, *Assistant Examiner.*